United States Patent
Yang et al.

(10) Patent No.: US 6,745,992 B2
(45) Date of Patent: Jun. 8, 2004

(54) PILOT OPERATED CONTROL VALVE HAVING A POPPET WITH INTEGRAL PRESSURE COMPENSATING MECHANISM

(75) Inventors: Xiaolong Yang, Germantown, WI (US); Michael J. Paik, Delafield, WI (US); Joseph L. Pfaff, Wauwatosa, WI (US)

(73) Assignee: Husco International, Inc., Waukesha, WI (US)

( * ) Notice: Subject to any disclaimer, the term of this patent is extended or adjusted under 35 U.S.C. 154(b) by 115 days.

(21) Appl. No.: 10/212,511

(22) Filed: Aug. 5, 2002

(65) Prior Publication Data

US 2004/0021103 A1 Feb. 5, 2004

(51) Int. Cl.[7] ............................ F16K 17/26; F16K 31/12
(52) U.S. Cl. ........................ 251/30.03; 251/129.15; 91/461
(58) Field of Search ........................ 251/30.01, 30.02, 251/30.03, 126, 129.15, 129.18, 34, 38, 26; 91/454, 461

(56) References Cited

U.S. PATENT DOCUMENTS

| 2,375,410 | A |   | 5/1945  | Gondek et al. |        |
|-----------|---|---|---------|---------------|--------|
| 2,480,712 | A |   | 8/1949  | Carbon        |        |
| 3,010,691 | A |   | 11/1961 | Canfield      |        |
| 3,926,210 | A |   | 12/1975 | Rasmussen     |        |
| 4,679,765 | A | * | 7/1987  | Kramer et al. | 251/38 |
| 5,036,877 | A |   | 8/1991  | Distler et al.|        |
| 5,072,752 | A |   | 12/1991 | Kolchinsky    |        |
| 6,328,275 | B1| * | 12/2001 | Yang et al.   | 251/30.03 |
| 6,457,487 | B1| * | 10/2002 | Stephenson et al. | 137/596.16 |

FOREIGN PATENT DOCUMENTS

| DE | 32 39 119 A1 | 4/1984 |
| EP | 0 204 666 B1 | 12/1986 |
| GB | 901061       | 7/1962  |
| GB | 940469       | 10/1963 |
| GB | 945328       | 12/1963 |

\* cited by examiner

Primary Examiner—Edward K. Look
Assistant Examiner—John K Fristoe, Jr.
(74) Attorney, Agent, or Firm—George E. Haas; Quarles & Brady LLP

(57) ABSTRACT

A pilot operated valve has a main poppet that selectively controls bidirectional flow of fluid between two ports in response to pressure in a control chamber on one side of the main poppet. The main poppet has a pilot orifice that is opened and closed by a pilot poppet. A unique mechanism is provided to compensate for variation of a pressure differential on opposite sides of the pilot orifice. This mechanism has a pair of annular end members between which extends a spring formed by a plurality of helices. Multiple passages with check valves extend through the main poppet to communicate the greatest pressure among the two ports to the control chamber and the lowest pressure among the two ports to the side of the pilot orifice that is opposite the control chamber.

42 Claims, 7 Drawing Sheets

PILOT OPERATED CONTROL VALVE HAVING A POPPET WITH INTEGRAL PRESSURE COMPENSATING MECHANISM

BACKGROUND OF THE INVENTION

1. Field of the Invention

The present invention relates to pilot operated hydraulic valves, and more particularly to such valves which incorporate mechanisms that compensate for variation of a pressure differential which exists across a pilot orifice.

2. Description of the Related Art

A wide variety of machines have moveable members which are operated by an hydraulic actuator, such as a cylinder and piston arrangement, that is controlled by a hydraulic valve. Traditionally the hydraulic valve was manually operated by the machine operator. There is a present trend away from manually operated hydraulic valves toward electrical controls and the use of solenoid valves. This type of control simplifies the hydraulic plumbing as the control valves do not have to be located near an operator station, but can be located adjacent the actuator being controlled. This change in technology also facilitates computerized control of the machine functions.

Application of pressurized hydraulic fluid from a pump to the actuator can be controlled by a set of proportional solenoid valves of a type described in U.S. Pat. No. 5,878,647. Solenoid operated pilot valves also are well known for controlling the flow of hydraulic fluid and employ an electromagnetic coil which moves an armature in one direction to open a valve. The armature acts on a pilot poppet that controls the flow of fluid through a pilot passage in a main valve poppet. The amount that the valve opens is directly related to the magnitude of electric current applied to the electromagnetic coil, thereby enabling proportional control of the hydraulic fluid flow. Either the armature or another valve member is spring loaded to close the valve when electric current is removed from the solenoid coil.

When an operator desires to move a member on the machine a control lever is operated to send electrical signals to the solenoid valves for the hydraulic actuator, for example a cylinder-piston combination, associated with that machine member. One solenoid valve is opened to supply pressurized fluid to the cylinder chamber one side of the piston and another solenoid valve opens to allow fluid being forced from the opposite cylinder chamber to drain to a reservoir, or tank. By varying the degree to which the solenoid valves are opened, the rate of flow into the associated cylinder chamber can be varied, thereby moving the piston at proportionally different speeds.

Conventional pilot-operated poppet valves are single directional. There is an inlet port and an outlet port of the valve and the pressure at the inlet port is communicated to the pilot control chamber thus enabling the valve to open when the inlet port pressure is greater than the pressure at the outlet port. This enables fluid to flow from the inlet port to the outlet port. Because of this arrangement, the valve can not be used to control the flow of fluid in the reverse direction from the outlet port to the inlet port. In some hydraulic systems, a bidirectional flow is desired to be controlled. To accommodate flow in both direction a second valve connected in a reverse parallel manner to the first valve was required. Therefore, it is desirable to create bidirectional pilot-operated poppet valve.

One type of bidirectional pilot valve has first port that leads to a side of a main poppet and a second port that leads to the nose of the main poppet. Typically the supply line from the pump was connected to the first port. An O-ring seal around the main poppet generally prevents fluid from leaking along the outer surface of the poppet between the first port and a pilot chamber of the valve. However, when the machine was powered down and the pump no longer supplies pressurized hydraulic fluid to the valve. Some leakage occurs past the O-ring seal over time. For example, it is common that over the night or weekends when a construction site is vacant, compressors and other pieces of equipment are stored raised by a front end loader for security reasons. Thus over these prolonged periods of machine non-use, leakage past the valve O-ring seal can result in the stored equipment dropping down. Thus it is desirable to reduce the number of leakage paths through the hydraulic valves.

SUMMARY OF THE INVENTION

A bidirectional, pilot-operated control valve has a body with a first port, a second port, and a valve seat between the first and second ports. A main valve poppet selectively engages the valve seat to control flow of fluid between the two ports. A control chamber is formed within the body on a side of the main valve poppet that is remote from the valve seat.

The main valve poppet has a pilot passage which opens into the control chamber through a pilot orifice. A first passage in the main valve poppet provides communication between the first port and the pilot passage, and a second passage creates a fluid path between the second port and the pilot passage. The main valve poppet has a third passage which provides communication between the first port and the control chamber, while a fourth passage forms a fluid path between the second port and the control chamber.

Each of the four passages has a flow control element, such as a check valve, for example, which allows fluid to flow in only one direction through the respective passage. Specifically, a first flow control element in the first passage allows fluid to flow only from the cavity into the first port. A second flow control element in the second passage allows fluid to flow only from the cavity into the second port. A third flow control element in the third passage allows fluid to flow only from the first port into the control chamber. A fourth flow control element in the fourth passage allows fluid to flow only from the second port into the control chamber.

An actuator operates a pilot poppet to selectively open and close the pilot orifice in the main valve poppet. Opening and closing of the pilot orifice produces movement of the main valve poppet with respect to the valve seat and controls the flow of fluid between the first and second ports.

Another aspect of the present invention is a novel mechanism which compensates for the effects of a varying pressure differential across the pilot orifice. This pressure compensating mechanism is associated with the pilot passage of the main valve poppet and is acted on by that varying pressure differentia. In one embodiment, the pressure compensating mechanism includes an end member slidably received in the pilot passage proximate to the control chamber with the pilot orifice extending there through. A spring is formed by a plurality of helices projecting from the first end member through the cavity and engaging the main valve poppet. The spring compresses and expands in response to variation of the pressure differential across the pilot orifice thus moving the pilot orifice to compensate for the effects of the pressure differential variation on the pilot operation of the main valve poppet.

DETAILED DESCRIPTION OF THE INVENTION

Figure 1:
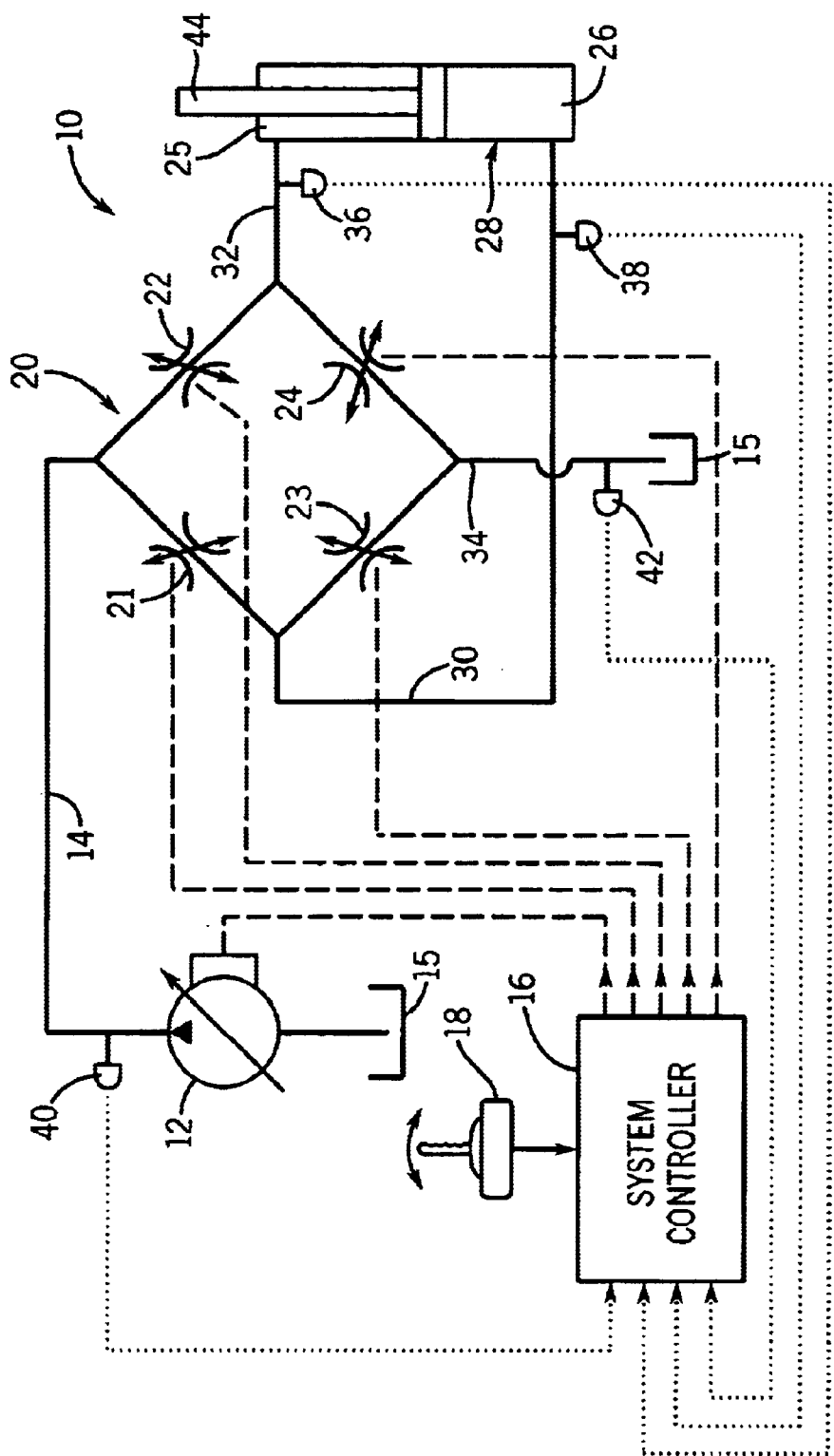
FIG. 1 is a schematic diagram of a hydraulic system which employs bidirectional solenoid operated pilot valves according to the present invention.

With initial reference to FIG. 1, a hydraulic system 10 of a machine that has mechanical elements operated by hydraulically driven actuators, such as cylinder 28. The hydraulic system 10 includes a variable displacement pump 12 is driven by a motor or engine (not shown) to draw hydraulic fluid under pressure from a tank 15 and furnish the hydraulic fluid under pressure to a supply line 14.

The supply line 14 is connected to an assembly 20 of four electrohydraulic proportional (EHP) valves 21, 22, 23, and 24 that control the flow of hydraulic fluid to and from the cylinder 28 in response to signals from a system controller 16. The first EHP valve 21 governs the flow of fluid from the supply line 14 to a first line 30 connected to the head chamber 26 of the cylinder 28. The second EHP valve 22 selectively couples the supply line 14 to a second line 32 which leads to the rod chamber 25 of the cylinder 28. The third EHP valve 23 is connected between the first line 30 for the head chamber 26 and a return line 34 that leads to the system tank 15. The fourth EHP valve 24 controls flow of fluid between the second line 32 and the tank return line 34.

The system controller 16 is a microcomputer based device which receives input signals from a user operated joystick 18 or similar input device and a number of pressure sensors. One pair of pressure sensors 36 and 38 detects the pressure within the rod and head chambers 25 and 26 of cylinder 28. Another pressure sensor 40 is placed in the pump outlet line 28, while pressure senor 42 is in the tank return line 34 to provide pressure measurement signals to the system controller 16. A software program executed by the system controller 16 responds to the input signals by producing output signals that control the variable displacement pump 12 and the four EHP valves 21–24.

In order to extend the rod 44 from the cylinder 28, the operator moves the joystick 18 in the appropriate direction to indicate the desired movement to the system controller 16. The system controller responds by activating the first and fourth EHP valves 21 and 24 which sends pressurized hydraulic fluid from the supply line 14 into the head chamber 26 of cylinder 28. This causes the piston 44 to rise which forces fluid from the rod chamber 25 through the fourth EHP valve 24 to the tank 15. The system controller 16 monitors the pressure in the various lines as is conventional practice to ensure that proper movement occurs. To retract the rod 44, the system controller 16 opens the second and third EHP valves 22 and 23 which sends pressurized hydraulic fluid from the supply line 14 into the rod cylinder's chamber 25 and exhausts fluid from the head chamber 26 to tank 15.

Figure 2:
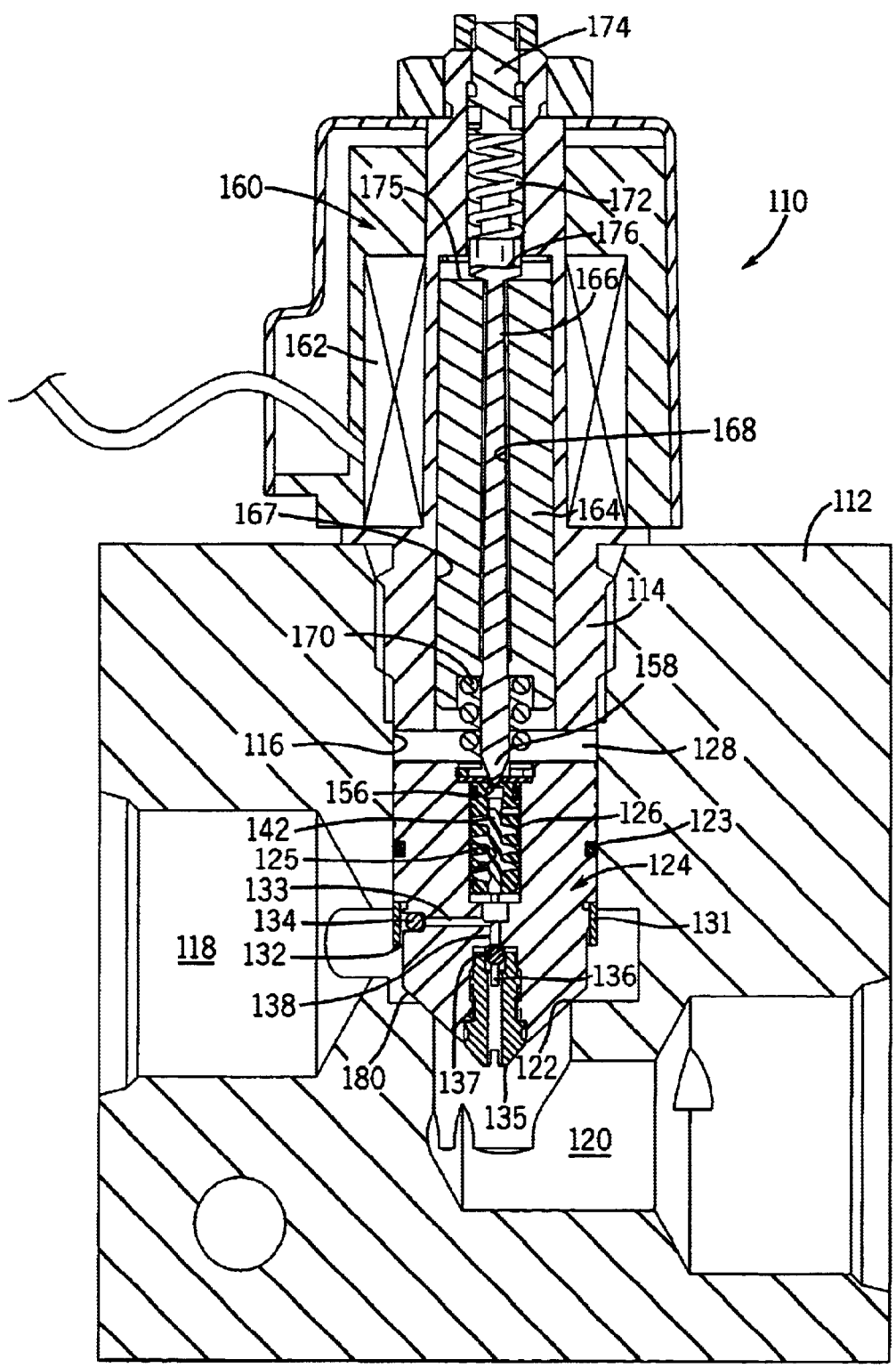
FIG. 2 is a cross sectional view through one of the bidirectional solenoid operated pilot valves.

FIG. 2 depicts the structure of each of the four EHP valves 21–24. This electrohydraulic proportional (EHP) valve 110 comprises a cylindrical valve cartridge 114 mounted in a longitudinal bore 116 of a valve body 112. The valve body 112 has a transverse first port 118 which communicates with the longitudinal bore 116. The first port 118 communicates with either the first or second lines 30 or 32 which is connected to the chambers of the cylinder 28. A second port 120 extends through the valve body 112 and communicates with an interior end of the longitudinal bore 116. The second port 120 communicates with either the supply line 14 or the tank return line 34, depending on the location of the particular valve in the assembly 20. A valve seat 122 is formed between the first and second ports 118 and 120.

Figure 3:
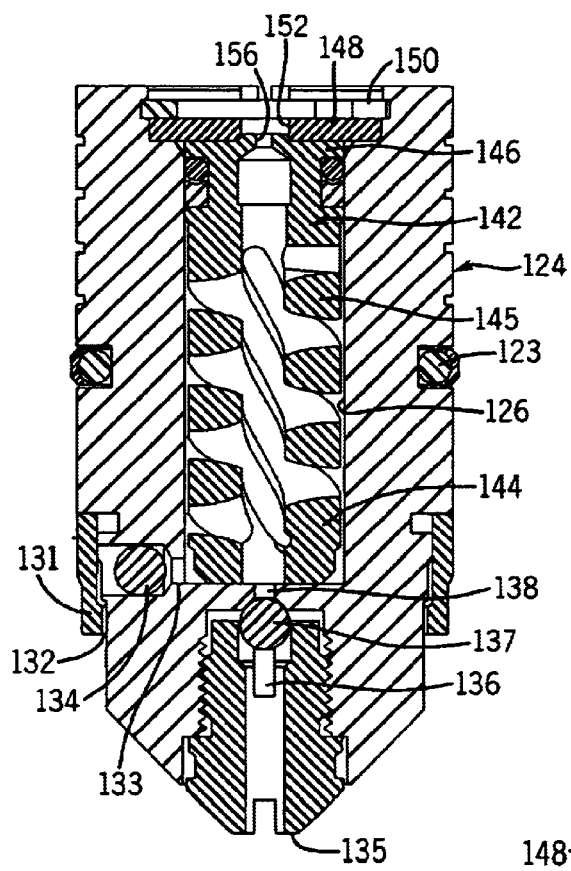
FIGS. 3 and 4 are two longitudinal cross sectional views along two orthogonally related planes through the poppet in the bidirectional solenoid operated pilot valve in FIG. 2.

With reference to FIGS. 2 and 3, a main valve poppet 124 slides within the longitudinal bore 116 with respect to the valve seat 122 to selectively control flow of hydraulic fluid between the first and second ports 118 and 120. An O-ring seal 123 extends around the main valve poppet 124 to minimize leakage of fluid along the bore 116. A pilot passage 125 is formed in the main valve poppet 124 by a central cavity 126, which has opening into a control chamber 128 on the remote side of the main valve poppet. A transverse first passage 133 connect the central cavity 126 to the first port 118 and first check valve 134 in that first passage allows fluid to flow only from the poppet's central cavity 126 and into the first port 118. The ball of the first check valve 134 is held in place by a ring 131 that extends around the poppet 124 and defining an entrance orifice 132 into the first check valve. That entrance orifice 132 is relatively small acting as a filter whereby most particles which could clog the first check valve 134 will be prevented from entering the poppet 124. A second passage 138 extends through the main valve poppet 124 from the central cavity 126 to the poppet nose 135. A second check valve 137 allows fluid flow in the second passage 138 only in a direction from the poppet cavity 126 to the second port 120. When the second check valve 137 is open fluid flows through a pair of small grooves 136 which serve as filters to trap most particles which could clog the second check valve.

Figure 4:
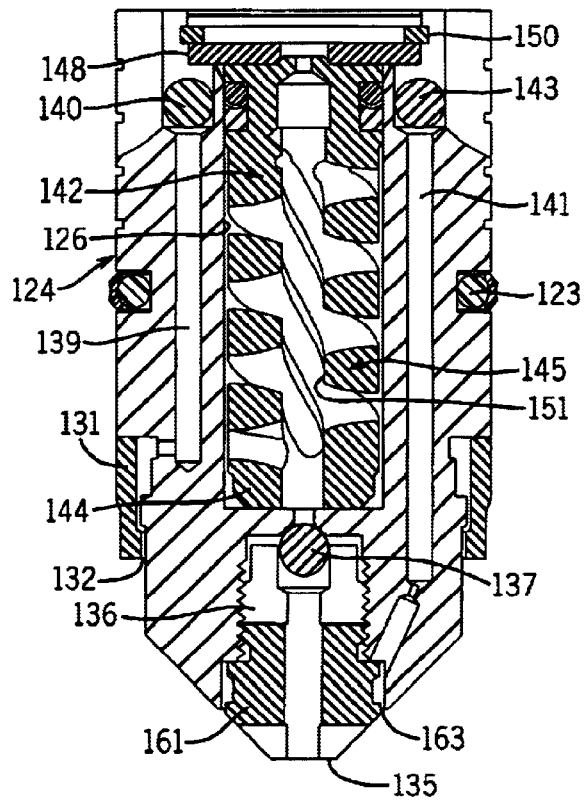

With reference to FIG. 4 which is a cross sectional view along a plane that is orthogonal to the plane of the view in FIG. 3, a third passage 139 extends through the main valve poppet 124 between the first port 118 and the control chamber 128. A third check valve 140 allows fluid to flow only from the first port 118 to the control chamber 128. The ring 131 around the poppet 124 defining an entrance orifice 132 into the third passage 139. That entrance orifice 132 is relatively small acting as a filter whereby most particles which could clog the third check valve 140 will be prevented from entering the third passage 139. A longitudinal fourth passage 141 extends through the main valve poppet 124 between the second port 120 and the control chamber 128. A fourth check valve 143 allows fluid to flow through the fourth passage 141 only from the second port 120 to the control chamber 128. A plug 161 that forms the poppet nose 135 provides a n entrance orifice 163 into the fourth passage 141. That entrance orifice 163 is relatively small acting as a filter whereby most particles which could clog the fourth check valve 143 will be prevented from entering the fourth passage 141. Alternatively, the third and fourth passages 139 and 141 and their respective check valves 140 and 143 can be formed in the valve body 112 on opposite sides of the longitudinal bore 116 in the cross sectional view of FIG. 2.

Referring still to FIGS. 3 and 4, a pressure compensating mechanism 142 is located within the cavity 126 of the main poppet 124 and has an interior end 144 which abuts a shoulder of the poppet cavity that is proximate to the second passage 138. An outer end 146 of the pressure compensating mechanism 142 is proximate to the end of the main poppet 124 which defines a portion of the control chamber 128. This outer end 146 abuts a disk 148 which is held within the poppet cavity 126 by a snap ring 150. The disk 148 has a central aperture 152 there through which communicates with a pilot orifice 156 in the outer end 146 of the pressure compensating mechanism 142.

Figure 5:
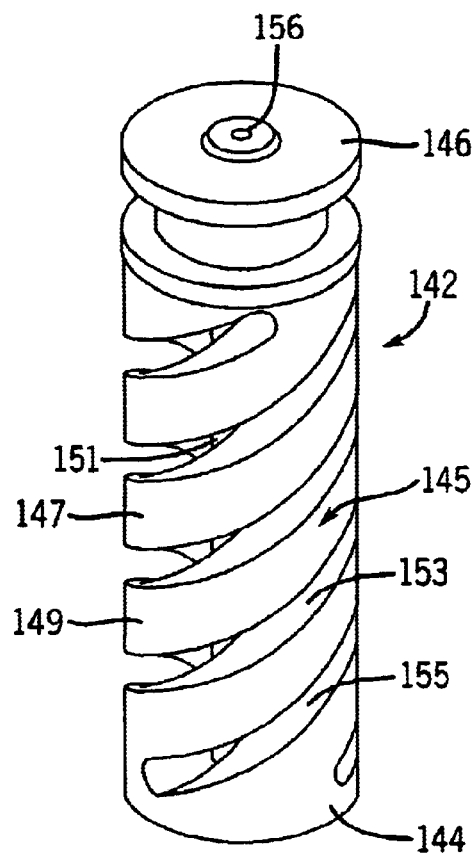
FIG. 5 is an isometric view of a pressure compensation spring in the poppet.

With additional reference to FIG. 5, a double helical spring 145 extends between the two ends 144 and 146 of the pressure compensating mechanism 142. Each helix 147 and 149 of the spring 145 has a generally rectangular cross-section. In one embodiment, the pressure compensating mechanism 142 is machined from a single cylindrical piece of steel. A central bore 151 is drilled substantially through the material and two helical grooves 153 and 155 are cut from the outer to the inner diametric surfaces to form two helixes 147 and 149. The helical grooves 153 and 155 do not extend to the end surfaces of the pressure compensating mechanism 142, thus providing solid annular ends 144 and 146 which distribute forces uniformly against adjacent members that those ends contact. More than one helix is required so that the compensation spring compresses symmetrically and does not tilt or cant within the cavity 126 of the main poppet 124. However, more than two helices may be provided.

Figure 6:
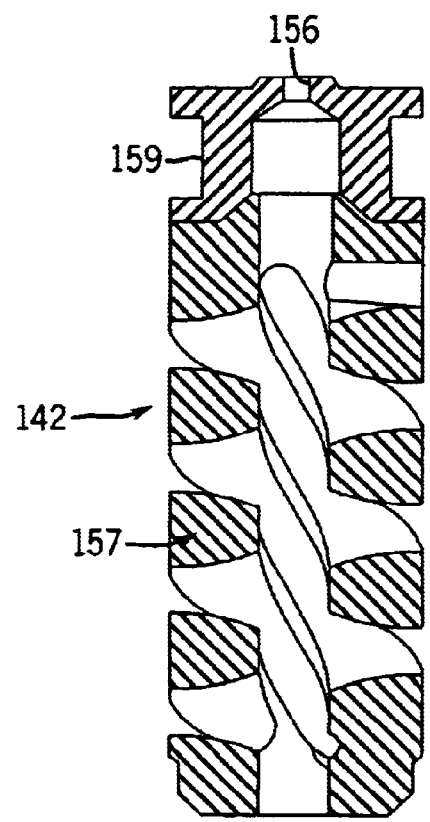
FIG. 6 is a cross sectional view through an alternative embodiment of the pressure compensation spring assembly.

FIG. 6 depicts an alternative two-piece embodiment of the pressure compensating mechanism 142. This structure has a double helical spring 157 and a separate end member 159 that has the pilot orifice 156.

Both forms of the pressure compensating mechanisms have a multiple helix spring which provides a substantially linear deflection to force characteristic. This characteristic is significantly more linear than a conventional coil spring that is wound from straight stock. Therefore, the spring rate for the pressure compensating mechanism is effective immediately upon application of a load force.

Referring again to FIG. 2, movement of the main valve poppet 124 is controlled by a solenoid 160 comprising an electromagnetic coil 162, an armature 164 and a pilot poppet 166. The armature 164 is positioned within a bore 167 through the cartridge 114 and a first spring 170 biases the main valve poppet 124 away from the armature 164. The pilot poppet 166 is located within a bore 168 of the tubular armature 164 and is biased toward the armature by a second spring 172 that engages an adjusting screw 174 threaded into the cartridge bore 167. The electromagnetic coil 162 is located around and secured to cartridge 114. The armature 164 slides within the cartridge bore 167 away from main valve poppet 124 in response to an electromagnetic field created by applying electric current to energize the electromagnetic coil 162.

In the de-energized state of the electromagnetic coil 162, a second spring 172 forces the pilot poppet 166 against end 175 of the armature 164, pushing both the armature and the pilot poppet toward the main valve poppet 124. This results in a conical tip 158 of the pilot poppet 166 entering and closing the pilot orifice 156 in the main valve poppet, thereby terminating communication between the control chamber 128 and the poppet cavity 126.

The EHP valve 110 proportionally meters the flow of hydraulic fluid between the first and second ports 118 and 120. The electric current generates an electromagnetic field which draws the armature 164 into the solenoid 160 and away from the main valve poppet 124. The magnitude of that electric current determines the amount that the valve opens and thus the rate of hydraulic fluid flow through the valve.

Specifically, when the pressure at the first port 118 exceeds the pressure at second port 120, the higher pressure is communicated to the control chamber 128 through the third check valve 140, shown in FIG. 4. As the armature 164 moves, the tip 158 of the pilot poppet 166 moves away from the main valve poppet 124 opening the pilot orifice 156. That action results in hydraulic fluid flowing from the first port 118 through the control chamber 128, pilot orifice 156 and the first check valve 134 to the second port 120. Flow of hydraulic fluid through the pilot passage 125 reduces the pressure in the control chamber 128 to that of the second port 120. Thus the higher pressure in the first port 118, that is applied to the surface 180, forces main valve poppet 124 away from valve seat 122 opening direct communication between the first and second ports 118 and 120. Movement of the main valve poppet 124 continues until a pressure/force balance is established across the main poppet 124 due to constant flow through the effective opening to the pilot orifice 156. Thus, the size of this valve opening and the flow rate of hydraulic fluid there through are determined by the position of the armature 164 and pilot poppet 166, which in turn controlled by the magnitude of current in electromagnetic coil 162.

Conversely, when pressure in the second port 120 exceeds the pressure in the first port 118, proportional flow from the second port to the first port can be obtained by activating the solenoid 160. In this case the higher second port pressure is communicated through the fourth check valve 143 (FIG. 4) to the control chamber 128 and when the pilot poppet 166 moves away from the pilot seat at orifice 156, fluid flows from the control chamber through the pilot passage 125 and first check valve 137 to the first port 118. This results in the main valve poppet 124 opening due to the higher pressure acting on its nose 135.

Variation of the load and supply pressures produces a varying pressure differential across the valve. In the closed state, the pressure differential affect the amount of force required to open previous solenoid operated pilot valves and thereafter produce a given flow rate of the hydraulic fluid. This effect in turn affected the magnitude of electrical current required to operate the valve. In the present EHP valve 110, the effect that a pressure differential has on the main poppet 124 is counter balanced the pressure compensating mechanism 142. The double helical spring 145 or 157 enables the pilot seat provided at the pilot orifice 156 to move in response to changed in the pressure differential across the main valve poppet 124. Such movement effectively changes the axial position of the pilot seat to offset the effect of the pressure differential change on the pilot valve. The designed flexibility of the seat is determined based on the spring rate of the double helical spring 145 or 157. As noted previously that spring rate of the unique pressure compensating mechanism 142 is very linear, even for relatively small amounts of movement.

With reference to FIGS. 1 and 2, The present electrohydraulic proportional valve 110 eliminates leakage past the O-ring seal 123 in a load holding mode. As described previously, there are times when the machine is turned off with a load being supported by the member that is driven by the cylinder 28. Thus the supported load exerts gravitational force on the cylinder rod 44 which is translated into pressure at the first port 118 of the EHP valve 110. The pressure is communicated through the third poppet passage 139 and the third check valve 140 in the main valve poppet 124 to the control chamber 128. Therefore the pressure on both sides of the O-ring seal 123 is equal thereby eliminating one path for fluid leakage in a load holding mode.

This is in contrast to prior connections of bidirectional EHP valves in which the second port 120 at the node of the main poppet 124 was connected to a cylinder chamber. In the load holding mode for this connection, the load pressure is communicated to the control chamber 128 through the fourth poppet passage 141 and the fourth check valve 143. The first port is at substantially zero pressure as the machine is turned off. Therefore, a large pressure differential exists across the O-ring seal 123 which will leak fluid over time in the load holding mode.

Figure 7:
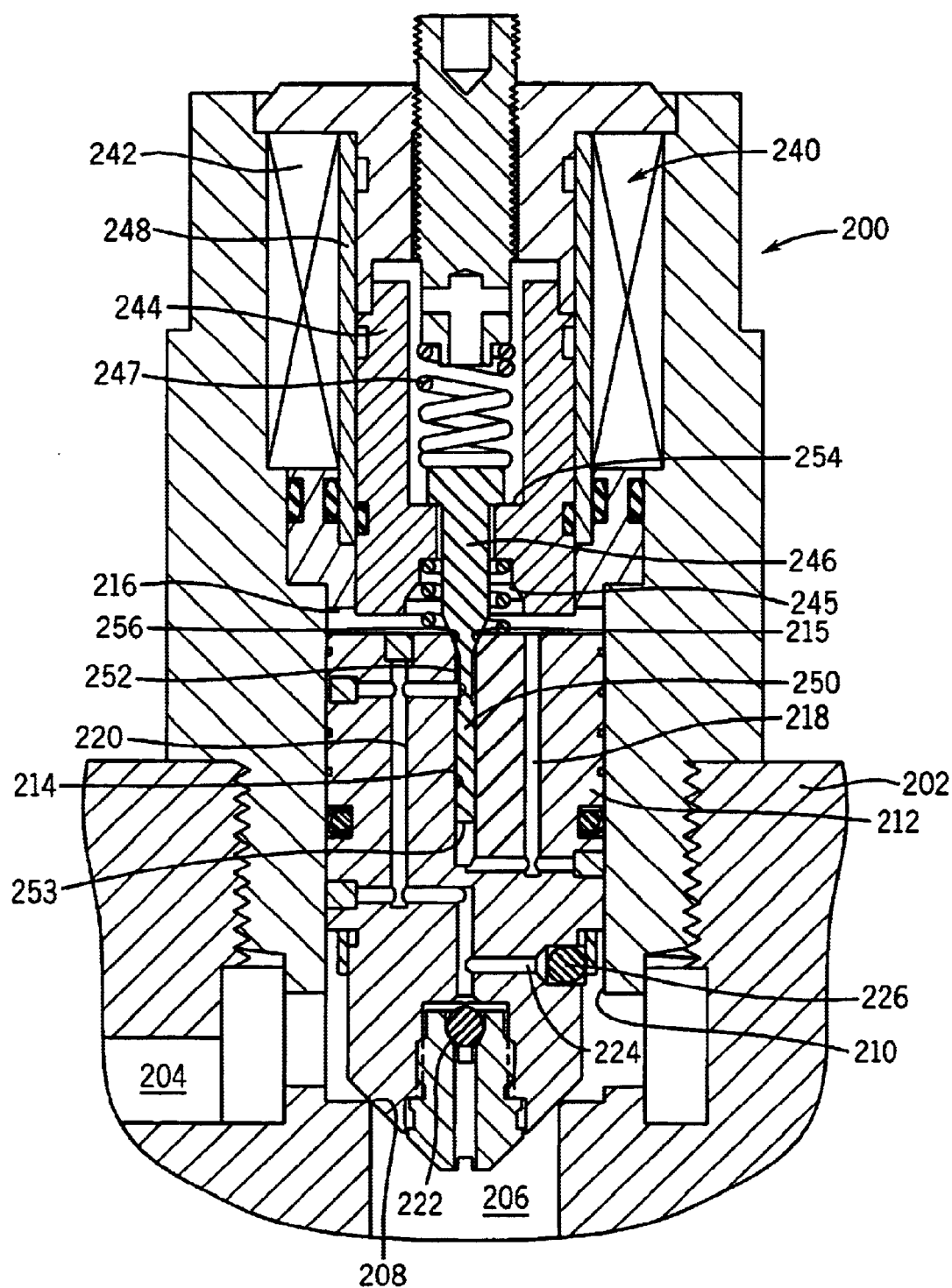
FIG. 7 is a cross sectional view through a second embodiment of a bidirectional solenoid operated pilot valve.

FIG. 7 illustrates another version of a bidirectional electrohydraulic proportional (EHP) valve 200 according to the present invention. The valve 200 is mounted in a body 202 that has an first port 204 and a second port 206 with a valve seat 208 there between. The body 202 has a longitudinal bore 210 within which is slidably positioned a main valve poppet 212, that selectively engages the valve seat 208 to control flow of hydraulic fluid between the first and second ports 204 and 206

The main valve poppet 212 has a centrally located pilot passage 214 which has a pilot orifice 215 opening into a control chamber 216. The innermost end of the pilot passage 214 communicates with a first passageway 218 that extends through the main valve poppet 212 and opens into the control chamber 216. A second passageway 220 extends through the main valve poppet 212 from an opening into the second port 206 to a point along the pilot passage 214 that is relatively close to but spaced from the opening into a control chamber 216. A first flow control element 222, such as a first check valve, is within the second passageway 220 and allows fluid to flow in only a direction from the second passageway 220 into the second port 206. A transverse passage 224 extends from the second passageway 220 into the first port 204 and has a second flow control element 226, such as a second check valve, therein which an allows fluid to flow in only a direction from the second passageway 220 into the first port 204.

Figure 8:
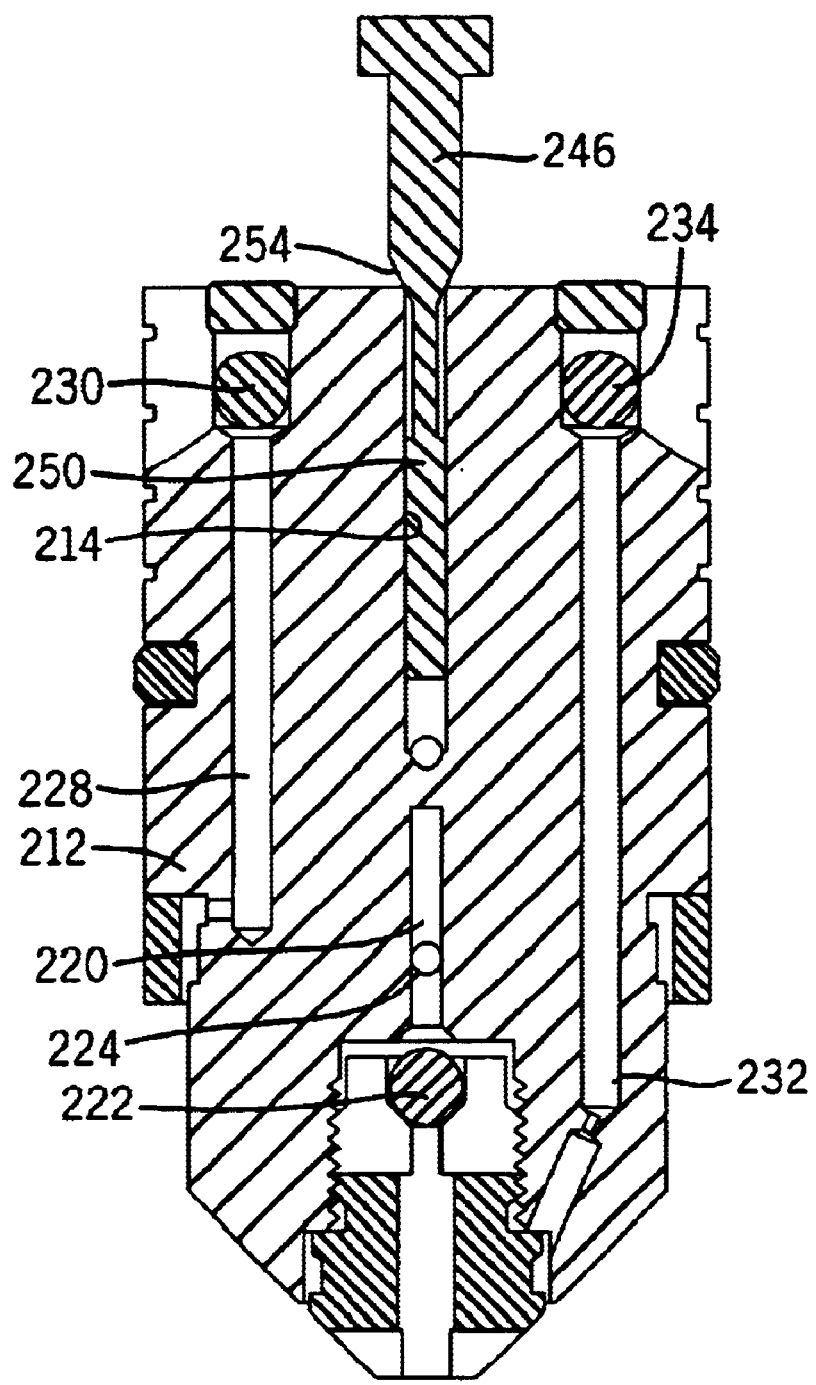
FIG. 8 is a cross sectional view through the main poppet of the pilot valve along a plane that is orthogonal to the plane of the cross section of FIG. 7.

With reference to FIG. 8, the main valve poppet 212 also includes a third passageway 228 which extends from the first port 204 to the control chamber 216. A third flow control element 230 limits the flow of fluid through the third passageway 228 to only a direction from the first port 204 to the control chamber 216. A fourth passageway 232 extends through the main valve poppet 212 between the second port 206 and the control chamber 216 and has a fourth flow control element 234 which permits flow of fluid only in a direction from the second port 206 to the control chamber 216.

Referring again to FIG. 7, movement of the main valve poppet 212 is controlled by a solenoid 240 comprising a solenoid coil 242, armature 244 and a pilot poppet 246. The solenoid coil 242 extends around a tube 248 of nonmagnetic material and the tubular armature 244 is located within the tube projecting toward the main valve poppet 212. Armature 244 slides within the tube 248 in response to an electromagnetic field created by energizing solenoid coil 242. A first spring 245 biases the armature 244 away from the main valve poppet 212 and a larger second spring 247 biases the pilot poppet 246 toward the main valve poppet and into an engagement which closes the pilot orifice 215.

A pressure balancing stem 250 projects from the pilot poppet 246 into the pilot passage 214 of the main valve poppet 212. The pressure balancing stem 250 has an annular recess 252 at the interface between the stem and a frusto conical portion 254 of the pilot poppet 246 which selectively closes the pilot orifice 215 of the pilot passage 214. The second passageway 220 opens into a portion of the pilot passage 214 within which the annular recess 252 is located. Therefore, the lesser of the pressures at the first and second ports 204 and 206 will be communicated through the second passageway 220 and applied to the annular recess 252 of the pressure balancing stem 250. The pressure in the control chamber 216 is communicated through the first passageway 218 and is applied to the inner end 253 of the pressure balancing stem 250.

The bidirectional EHP valve 200 opens varying amounts in response to application of electric current to the solenoid 240. The rate of hydraulic fluid flow through the valve 200 is directly proportional to the magnitude of electric current passing through the solenoid coil 242. The electric current generates an electromagnetic field which draws the armature 244 farther into the solenoid coil 242 and away from the main valve poppet 212. Because a shoulder 254 of the armature 244 engages a mating surface on the pilot poppet 246, that latter element also moves away from the main valve poppet 212, thereby allowing hydraulic fluid to flow from the control chamber 216 into the pilot passage 214 and into the second passageway 220. Before this action, the control chamber 216 was maintained at the higher of the pressures at the first and second ports 204 and 206 due to passageways 228 and 232 and check valves 230 and 234 (FIG. 8). Thus when the pilot passage 214 opens upon movement of the pilot poppet 246, the pressure in the control chamber 216 is released through the second passageway 220 and either the first or second check valve 222 or 226 to whichever of the first and second ports 204 and 206 is at a lesser pressure.

This action creates a pressure differential which causes the main valve poppet 212 to move away from the primary valve seat 208 opening a direct channel between the first and second ports 204 and 206. The movement of the main valve poppet 212 continues until it contacts the frustoconical portion 256 of the pilot poppet 246. Thus, the distance that the main valve poppet moves away from the valve seat 208, the size of an opening that is created between the first and second ports and the flow rate of hydraulic fluid there between, are determined by the position of the armature 244 and pilot poppet 246. Those parameters are in turn controlled by the magnitude of current flowing through the solenoid coil 242.

The pressure balancing stem 250 of the pilot poppet 246 is positioned in the pilot passage 214 with the annular recess 252 around the stem in communication with the second passageway 220. Thus, under ordinary conditions, the annular recess 252 is exposed to the lesser of the port pressures, and the inner end 253 of the pressure balancing stem 250 is exposed to the greater of the port pressures. Preferably, the effective pressure-responsive area of stem recess 250 and the stem end surface is essentially equal to the effective area of the pilot poppet 246 upon which the control pressure acts to urge the pilot poppet toward the main valve poppet 212. In this way, the pilot poppet 212 will be hydrodynamically balanced so that the only forces acting upon it will be due to second spring 247 and the solenoid coil 242. Thus the pressure balancing stem 250 provides a pressure compensating mechanism which compensates operation of the pilot poppet for effects produced by a pressure differential between the pilot passage and the control chamber.

Figure 9:
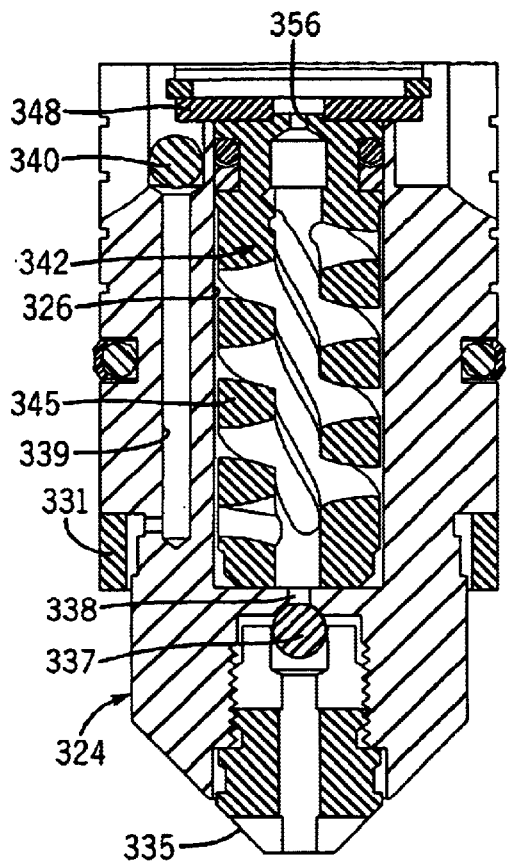
FIG. 9 is a cross sectional view through the main poppet of a unidirectional version of a pilot valve similar to that shown in FIGS. 3 and 4.

With reference to FIGS. 2 and 9, another main valve poppet 324 with a pressure compensating mechanism is used in a unidirectional electrohydraulic proportional valve. This main valve poppet 324 is adapted to slide within the longitudinal bore 116 with respect to the valve seat 122 of the valve body 112 in FIG. 2 to selectively control flow of hydraulic fluid between the first and second valve ports 118 and 120. A pilot passage is formed in the main valve poppet 324 by a central cavity 326, which has opening into a control chamber 128 on the remote side of the main valve poppet. A passage 338 extends through the main valve poppet 324 from the central cavity 326 to the poppet nose 335. A check valve 337 allows fluid flow in passage 338 only in a direction from the poppet cavity 326 to the second port 120. Unlike the prior embodiments of the main valve poppet, there is not a corresponding transverse passage between the central cavity 326 and the first port 118.

Another passage 339 extends through the main valve poppet 324 between the first port 118 and the control chamber 128. A check valve 340 in passage 339 allows fluid to flow only from the first port 118 to the control chamber 128. A ring 331 around the poppet 324 defines a relatively small entrance orifice into passage 339 which acts as a filter whereby most particles which could clog check valve 340 will be prevented from entering passage 339. A pressure compensating mechanism 342, that has the same structure and operation as the previously described pressure compensating mechanism 142 in FIG. 5, is located in the central cavity 326 of the main valve poppet 324. Specifically the pressure compensating mechanism 342 has a double helical spring 345 which biases the mechanism against a disk 349 that extends across the main valve poppet bore 326 adjacent the control chamber 116.

The main valve poppet 324, when incorporated into the valve body shown in FIG. 2, controls the flow of fluid in a single direction from the first port 118 to the second port 120. Passages 338 and 339 apply the port pressures to opposite sides of the pressure compensating mechanism 324 enabling the pilot orifice 356 to move as described with respect to the prior embodiments.

This main valve poppet 324, and the previous versions, also reduce the occurrence of cavitation in the chambers 25 and 26 of the cylinder 28 connected to the second port 120 of the valve (see FIG. 1). Cavitation occurs when the forces acting on the piston cause a cylinder chamber to expand faster than fluid can be supplied to fill that chamber. This event is indicated by a significant negative gage pressure occurring in that cylinder chamber. Referring again to FIGS. 2 and 9, that negative gage pressure is communicated to the second port 120 of the electrohydraulic valve 110. The negative gage pressure opens check valve 337 thereby applying that pressure level to the interior side of the pressure compensating mechanism 342. This action draws the pilot orifice 356 downward in the drawings away from the pilot poppet 156 thereby causing the main valve poppet 324 to move upward. That movement enlarges the valve opening and supplies more fluid into the second port 120 to fill any voids in the expanding cylinder chamber.

Figure 10:
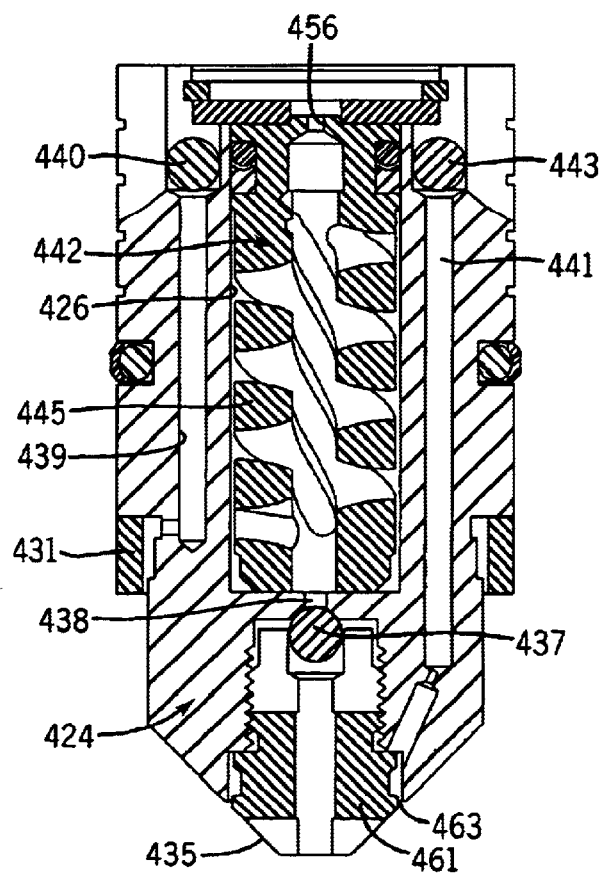
FIG. 10 is a cross sectional view of the main poppet in FIG. 9 with a reverse flow check valve.

With reference to FIGS. 2 and 10, a further version of a main valve poppet is used in a unidirectional electrohydraulic proportional valve to provide pressure compensation and reverse flow checking. This main valve poppet 424 slides within the longitudinal bore 116 with respect to the valve seat 122 to selectively control flow of hydraulic fluid between the first and second ports 118 and 120. A pilot passage is formed in the main valve poppet 424 by a central cavity 426, which has opening into the control chamber 128. A passage 438 extends through the main valve poppet 424 from the central cavity 426 to the poppet nose 435. A check valve 437 allows fluid flow in passage 438 only in a direction from the poppet cavity 426 to the second port 120.

Another passage 439 extends through the main valve poppet 424 between the first port 118 and the control chamber 128. A different check valve 440 allows fluid to flow only from the first port 118 to the control chamber 128. A ring 431 around the poppet 424 defines a relatively small entrance orifice into passage 439 which acts as a filter whereby most particles which could clog check valve 440 will be prevented from entering passage 439. Yet anther passage 441 extends through the main valve poppet 424 between the second port 120 and the control chamber 128. A further check valve 443 allows fluid to flow through passage 441 only from the second port 120 to the control chamber 128. A plug 461 that forms the poppet nose 435 provides an entrance orifice 463 into passage 441. That entrance orifice 463 is relatively small acting as a filter whereby most particles which could clog check valve 443 will be prevented from entering passage 441. A pressure compensating mechanism 442, that has the same structure and operation as the previously described pressure compensating mechanism 142, is located in the central cavity 426 of the main valve poppet 424.

The main valve poppet 424 controls the flow of fluid in a single direction from the first port 118 to the second port 120 in the same manner as the version depicted in FIG. 9. However, this latter main valve poppet 424 also provides reverse flow checking. Reverse flow, from the second port 120 to the first port 118, occurs when the pressure at the second port is greater than that at the first port; a reversal of the pressure relationship which allowed the valve to open. That pressure reversal causes check valve 143 to open which communicates the higher second port pressure to the control chamber 116 above the main valve poppet 424 and closes check valve 440. Now the pressures on the opposite sides of the pressure compensating mechanism 442 are the same. This result in the pressure compensating mechanism biasing the pilot passage 456 upward, thereby moving the main valve poppet 424 toward the valve seat 122 between the first and second ports closing the opening there between.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A bidirectional pilot operated valve comprising:

a body having a first port and a second port, and including a valve seat between the first port and the second port;

a main poppet selectively engaging the valve seat to control flow of fluid between the first port and the second port, and forming a control chamber on a side of the main poppet remote from the valve seat, a pilot passage in the main poppet includes a pilot orifice that opens into the control chamber, a first passage extends between the pilot passage and the first port and a second passage extends between the pilot passage and the second port, the main poppet further comprises a third passage providing communication between the first port and the control chamber, and a fourth passage extends between the second port and the control chamber;

a first flow control element in the first passage allows fluid to flow only from pilot passage into the first port;

a second flow control element in the second passage allows fluid to flow only from the pilot passage into the second port;

a third flow control element in the third passage allows fluid to flow only from the first port into the control chamber;

a fourth flow control element in the fourth passage allows fluid to flow only from the second port into the control chamber;

a pilot poppet which operates to open and close the pilot orifice;

a pressure compensating mechanism which compensates operation of the pilot poppet for effects produced by a pressure differential between the pilot passage and the control chamber; and an actuator operably coupled to move the pilot poppet with respect to the main poppet.

2. The bidirectional pilot operated valve as recited in claim 1 wherein the pressure compensating mechanism comprises a movable valve seat between the pilot passage and the control chamber and having the pilot orifice extending there through, wherein the pilot poppet engages the movable valve seat to close the pilot orifice.

3. The bidirectional pilot operated valve as recited in claim 1 wherein the pressure compensating mechanism comprises a member within the pilot passage proximate to the control chamber and having the pilot orifice extending there through, and a spring having a plurality of helices biasing the member toward the control chamber with respect to the main poppet.

4. The bidirectional pilot operated valve as recited in claim 3 wherein each of the plurality of helices has a rectangular cross-section.

5. The bidirectional pilot operated valve as recited in claim 3 wherein the member and spring are formed as a single piece.

6. The bidirectional pilot operated valve as recited in claim 1 wherein the pressure compensating mechanism comprises a stem in the pilot passage and having an annular recess, wherein pressure communicated through either the first flow control element or the second flow control element acts on a portion of the stem which forms the annular recess.

7. The bidirectional pilot operated valve as recited in claim 6 wherein the main poppet further comprises a first passageway extending between the control chamber and the pilot passage, wherein pressure communicated through the first passageway acts on the stem.

8. The bidirectional pilot operated valve as recited in claim 6 wherein the stem and the pilot poppet are formed as a single piece.

9. The bidirectional pilot operated valve as recited in claim 1 wherein the actuator comprises a solenoid with an armature that engages the pilot poppet.

10. The bidirectional pilot operated valve as recited in claim 1 further comprising:

a first filter mechanism in the first passage between the first flow control element and the first port to inhibit flow of particles;

a second filter mechanism in the second passage between the second flow control element and the second port to inhibit flow of particles;

a third filter mechanism in the third passage between the third flow control element and the first port to inhibit flow of particles;

a fourth filter mechanism in the fourth passage between the fourth flow control element and the second port to inhibit flow of particles.

11. The bidirectional pilot operated valve as recited in claim 1 further comprising a ring extending around the main poppet and partially covering an opening of the first passage into the first port so as to inhibit flow of particles into the first passage.

12. The bidirectional pilot operated valve as recited in claim 1 wherein the ring also partially covers an opening of the third passage into the first port so as to inhibit flow of particles into the first passage.

13. The bidirectional pilot operated valve as recited in claim 1 further comprising a plug which provides a restriction of an opening of the fourth passage into the second port so as to inhibit flow of particles into the fourth passage.

14. A pilot operated valve comprising:

a body having a first port and a second port with a valve seat there between;

a main poppet selectively engaging the valve seat to control flow of fluid between the first port and the second port, and forming a control chamber on a side of the main poppet remote from the valve seat, the main poppet having a cavity that has an opening into the control chamber;

a pressure compensating mechanism within the cavity of the main poppet and having a pilot seat member extending across the opening and moveable with respect to the main poppet, the pilot seat member having a pilot orifice extending there through and selectively engaged by the pilot poppet;

a first passageway between the first port and the control chamber;

a second passageway between the second port and the cavity;

a first flow control element in the first passageway allows fluid to flow only from the first port into the control chamber;

a second flow control element in the second passageway allows fluid to flow only from the cavity into the second port;

a pilot poppet which operates to open and close the pilot orifice; and an actuator operably coupled to move the pilot poppet with respect to the main poppet.

15. The pilot operated valve as recited in claim 14 wherein the pilot seat member comprises a resilient element.

16. The pilot operated valve as recited in claim 15 wherein the resilient member flexes in response to a difference in pressure on opposite sides of the resilient member, thereby moving the pilot orifice with respect to the main poppet.

17. The pilot operated valve as recited in claim 14 wherein the pilot seat member comprises an end member proximate to the control chamber and having the pilot orifice extending there through, and a spring having a plurality of helices projecting away from the first end member into the cavity of the main poppet.

18. The pilot operated valve as recited in claim 17 wherein each of the plurality of helices has a rectangular cross-section.

19. The pilot operated valve as recited in claim 17 wherein the first end member and spring are formed as a single piece.

20. The pilot operated valve as recited in claim 14 further comprising a third passageway extending between the second port and the control chamber; and a third flow control element in the third passageway allows fluid to flow only from the second port into the control chamber.

21. The pilot operated valve as recited in claim 20 further comprising a fourth passageway extending between the first port and the cavity; and a fourth flow control element in the fourth passageway allows fluid to flow only from the first port into the cavity.

22. The bidirectional pilot operated valve as recited in claim 20 wherein each of the plurality of helices has a rectangular cross-section.

23. A pilot operated valve comprising:
a body having a first port and a second port, and including a valve seat between the first port and the second port;
a main poppet selectively engaging the valve seat to control flow of fluid between the first port and the second port, and forming a control chamber on a side of the main poppet remote from the valve seat, the main poppet having a cavity that opens into the control chamber;
a pressure compensating mechanism within the cavity of the main poppet and having a first end member proximate to the control chamber with a pilot orifice extending through the first end member, and the pressure compensating mechanism further including a spring formed by a plurality of helices projecting away from the first end member into the cavity of the main poppet;
a first passageway between the first port and the cavity;
a second passageway between the second port and the control chamber;
a pilot poppet which operates to open and close the pilot orifice; and
an actuator operably coupled to move the pilot poppet with respect to the main poppet.

24. The bidirectional pilot operated valve as recited in claim 23 further comprising:
a first flow control element in the first passageway which allows fluid to flow only from cavity into the first port; and
a second flow control element in the second passageway which allows fluid to flow only from the first port into the control chamber.

25. The bidirectional pilot operated valve as recited in claim 24 further comprising:
a third passageway between the second port and the cavity;
a fourth passageway between the first port and the control chamber;
a third flow control element in the third passageway allows fluid to flow only from the cavity into the second port; and
a fourth flow control element in the fourth passageway allows fluid to flow only from the first port into the control chamber.

26. The bidirectional pilot operated valve as recited in claim 23 wherein the pressure compensating mechanism further comprises a second end member to which the plurality of helices are attached.

27. The bidirectional pilot operated valve as recited in claim 26 wherein the first end member and the second end member both have annular shapes.

28. The bidirectional pilot operated valve as recited in claim 26 wherein the first end member, the second end member and the spring are formed as a single piece.

29. The bidirectional pilot operated valve as recited in claim 26 wherein the second end member and spring are formed as a single piece.

30. The bidirectional pilot operated valve as recited in claim 23 wherein the first end member and the spring are formed as a single piece.

31. A bidirectional pilot operated valve comprising:
a body having a first port and a second port and including a valve seat between the first port and the second port;
a main poppet selectively engaging the valve seat to control flow of fluid between the first port and the second port, and forming a control chamber on a side of the main poppet remote from the valve seat, the main poppet having a cavity opening into the control chamber, a first passage provides communication between the first port and the cavity, and a second passage provides communication between the second port and the cavity,
one of the body and the main poppet further including a third passage provides communication between the first port and the control chamber;
one of the body and the main poppet further including a fourth passage provides communication between the second port and the control chamber;
a first flow control element in the first passage allows fluid to flow only from the cavity into the first port;
a second flow control element in the second passage allows fluid to flow only from the cavity into the second port;
a third flow control element in the third passage allows fluid to flow only from the first port into the control chamber;
a fourth flow control element in the fourth passage allows fluid to flow only from the second port into the control chamber;
a pressure compensating mechanism within the cavity of the main poppet and having a first end member proximate to the control chamber with a pilot orifice extending through the first end member, and the pressure compensating mechanism further including a spring formed by a plurality of helices projecting away from the first end member through the cavity of the main poppet;
a pilot poppet which selectively closes the pilot orifice; and
an actuator operably coupled to move the pilot poppet with respect to the main poppet.

32. The bidirectional pilot operated valve as recited in claim 31 wherein the third passage and the fourth passage are in the main poppet.

33. The bidirectional pilot operated valve as recited in claim 31 wherein the pressure compensating mechanism further comprises a second end member to which the plurality of helices are attached.

34. The bidirectional pilot operated valve as recited in claim 33 wherein the first end member and the second end member both have annular shapes.

35. The bidirectional pilot operated valve as recited in claim 33 wherein the first end member, the second end member and the spring are formed as a single piece.

36. The bidirectional pilot operated valve as recited in claim 33 herein the second end member and spring are formed as a single piece.

37. The bidirectional pilot operated valve as recited in claim 31 wherein the first end member and the spring are formed as a single piece.

38. The bidirectional pilot operated valve as recited in claim 31 wherein each of the plurality of helices has a rectangular cross-section.

39. A bidirectional pilot operated valve comprising:

a body having a first port and a second port, and including a valve seat between the first port and the second port;

a main poppet selectively engaging the valve seat to control flow of fluid between the first port and the second port and forming a control chamber on a side of the main poppet remote from the valve seat, a pilot passage in the main poppet includes a pilot orifice that opens into the control chamber, the main poppet further comprising a first passageway extends from the control chamber to an opening into the pilot passage, a second passageway which opens into the pilot passage at a point between the opening and the control chamber, a third passageway extending between the first port and the control chamber, and a fourth passageway extending between the second port and the control chamber;

a first flow control element coupling the second passageway to the first port and allowing fluid to flow only from the second passageway into the first port;

a second flow control element coupling the second passageway to the second port and allowing fluid to flow only from the second passageway into the second port;

a third flow control element in the third passageway and allowing fluid to flow only from the first port into the control chamber;

a fourth flow control element in the fourth passageway and allowing fluid to flow only from the second port into the control chamber;

a pilot poppet which operates to open and close the pilot orifice;

a pressure compensating stem in the pilot passage and engagable by the pilot poppet, the pressure compensating stem compensates operation of the pilot poppet for effects produced by a pressure differential between the pilot passage and the control chamber; and an actuator operably coupled to move the pilot poppet with respect to the main poppet.

40. The bidirectional pilot operated valve as recited in claim 39 wherein the pressure compensating stem has an annular recess located adjacent to the point where the second passageway opens into the pilot passage.

41. The bidirectional pilot operated valve as recited in claim 40 wherein pressure communicated through the first passageway acts on an end of the stem.

42. The bidirectional pilot operated valve as recited in claim 40 wherein the stem and the pilot poppet are formed as a single piece.

* * * * *